(12) United States Patent
Fukuo et al.

(10) Patent No.: US 11,111,652 B2
(45) Date of Patent: Sep. 7, 2021

(54) CONSTRUCTION MACHINE EQUIPPED WITH BATTERY

(71) Applicant: KOBELCO CONSTRUCTION MACHINERY CO., LTD., Hiroshima (JP)

(72) Inventors: Nobuhiro Fukuo, Hiroshima (JP); Yoshiaki Fujimoto, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 203 days.

(21) Appl. No.: 16/335,458

(22) PCT Filed: Sep. 27, 2017

(86) PCT No.: PCT/JP2017/034910
§ 371 (c)(1),
(2) Date: Mar. 21, 2019

(87) PCT Pub. No.: WO2018/070245
PCT Pub. Date: Apr. 19, 2018

(65) Prior Publication Data
US 2019/0218752 A1     Jul. 18, 2019

(30) Foreign Application Priority Data

Oct. 14, 2016   (JP) .............................. JP2016-202927

(51) Int. Cl.
*E02F 9/24* (2006.01)
*E02F 9/26* (2006.01)
(Continued)

(52) U.S. Cl.
CPC ................ *E02F 9/24* (2013.01); *B60R 25/00* (2013.01); *E02F 9/267* (2013.01); *E02F 9/2095* (2013.01)

(58) Field of Classification Search
CPC ....... E02F 9/24; E02F 9/26; E02F 9/20; E02F 9/267; E02F 9/2095; B60R 25/00
See application file for complete search history.

(56) References Cited

U.S. PATENT DOCUMENTS

2003/0160692 A1*  8/2003  Nonaka ................. B60R 25/102
                                                                340/539.11
2013/0119784 A1   5/2013  Kim et al.
2013/0207797 A1*  8/2013  Shimazu .................. E02F 9/24
                                                                340/441

FOREIGN PATENT DOCUMENTS

EP        1 319 563 A1    6/2003
JP      2005-264605 A     9/2005
(Continued)

OTHER PUBLICATIONS

Extended European Search Report issued Aug. 12, 2019 in Patent Application No. 17861154.7, 9 pages.
(Continued)

*Primary Examiner* — Aniss Chad
*Assistant Examiner* — Ali Wahab
(74) *Attorney, Agent, or Firm* — Oblon, McClelland, Maier & Neustadt, L.L.P.

(57) ABSTRACT

Provided is a construction machine capable of restricting halt of a function controlled by a controller when a key switch is in a key-off state. The construction machine includes an interruption switch switched between a supply allowing state of allowing supply of power from a battery to the controller and a supply interruption state of interrupting the power supply; a sensor detecting presence/absence of interruption necessary motion necessary for manipulating the interruption switch; and an alarm control device that causes an alarm device to issue an alarm only when the following conditions are all satisfied. The key switch is in the key-off state; the interruption switch is in the supply (Continued)

allowing state; the controller is being operated; and the sensor has detected presence of the interruption necessary motion.

3 Claims, 6 Drawing Sheets

(51) Int. Cl.
    *B60R 25/00*    (2013.01)
    *E02F 9/20*    (2006.01)

(56) References Cited

FOREIGN PATENT DOCUMENTS

| JP | 2006-274750 A | 10/2006 |
|----|---------------|---------|
| JP | 2013-133088 A | 7/2013 |
| JP | 2015-45144 A | 3/2015 |
| JP | 5836405 B2 | 12/2015 |
| JP | 2016-132857 A | 7/2016 |

OTHER PUBLICATIONS

International Search Report dated Dec. 12, 2017 in PCT/JP2017/034910 dated Sep. 27, 2017.

* cited by examiner

CONSTRUCTION MACHINE EQUIPPED WITH BATTERY

TECHNICAL FIELD

The present invention relates to a construction machine equipped with a battery.

BACKGROUND ART

The construction machine recited in Patent Literature 1 has been conventionally known. The construction machine includes a battery, a key switch, a controller, and an interruption switch. The controller controls a part of functions of the construction machine after the key switch is brought into a key-off state, i.e., after key-off. The interruption switch is manually manipulated to thereby interrupt supply of power from the battery to the controller.

The controller is kept operated even after key-off; however, if the interruption switch is manipulated to interrupt power supply from the battery to the controller, the function which has been controlled by the controller until then is also halted, which might be a hindrance to the construction machine. As means for avoiding such a disadvantage, Patent Literature 1 discloses in FIG. 7 to light a display portion during operation of the controller after key-off to thereby restrain the interruption switch from being manipulated.

However, the display portion, being constantly lighted during the operation of the controller after key-off, leaves the possibility that an operator may erroneously manipulate the interruption switch irrespective of the lighting to halt even a function that is controlled by the controller in the key-off state of the key switch.

CITATION LIST

Patent Literature

Patent Literature 1: Japanese Patent No. 5836405

SUMMARY OF INVENTION

An object of the present invention is to provide a construction machine equipped with a battery, a key switch, and a controller, the construction machine being capable of efficiently restricting erroneous interruption of supply of power from the battery to the controller in a key-off state of the key switch to halt a function that has been controlled until then by the controller.

The provided construction machine includes a battery, a controller, a key switch, an interruption switch, a sensor, an alarm device capable of issuing an alarm, and an alarm control device that causes the alarm device to issue an alarm. The controller is operated by supply of power from the battery. The key switch is connected to the controller and switched between a key-off state of providing the controller with an instruction to halt an engine and a key-on state of providing the controller with no instruction to halt the engine. The interruption switch is switched between a supply allowing state of allowing supply of power from the battery to the controller and a supply interruption state of interrupt supply of power from the battery to the controller. The sensor detects presence/absence of interruption necessary motion which is a motion necessary for manipulating the interruption switch. The alarm control device causes the alarm device to issue the alarm only when a condition that the key switch is in the key-off state, a condition that the interruption switch is in the supply allowing state, a condition that the controller is being operated, and a condition that the sensor has detected presence of the interruption necessary motion are all satisfied.

DESCRIPTION OF EMBODIMENTS

FIGS. 1 to 4 show a construction machine 1 according to a first embodiment of the present invention.

Figure 1:
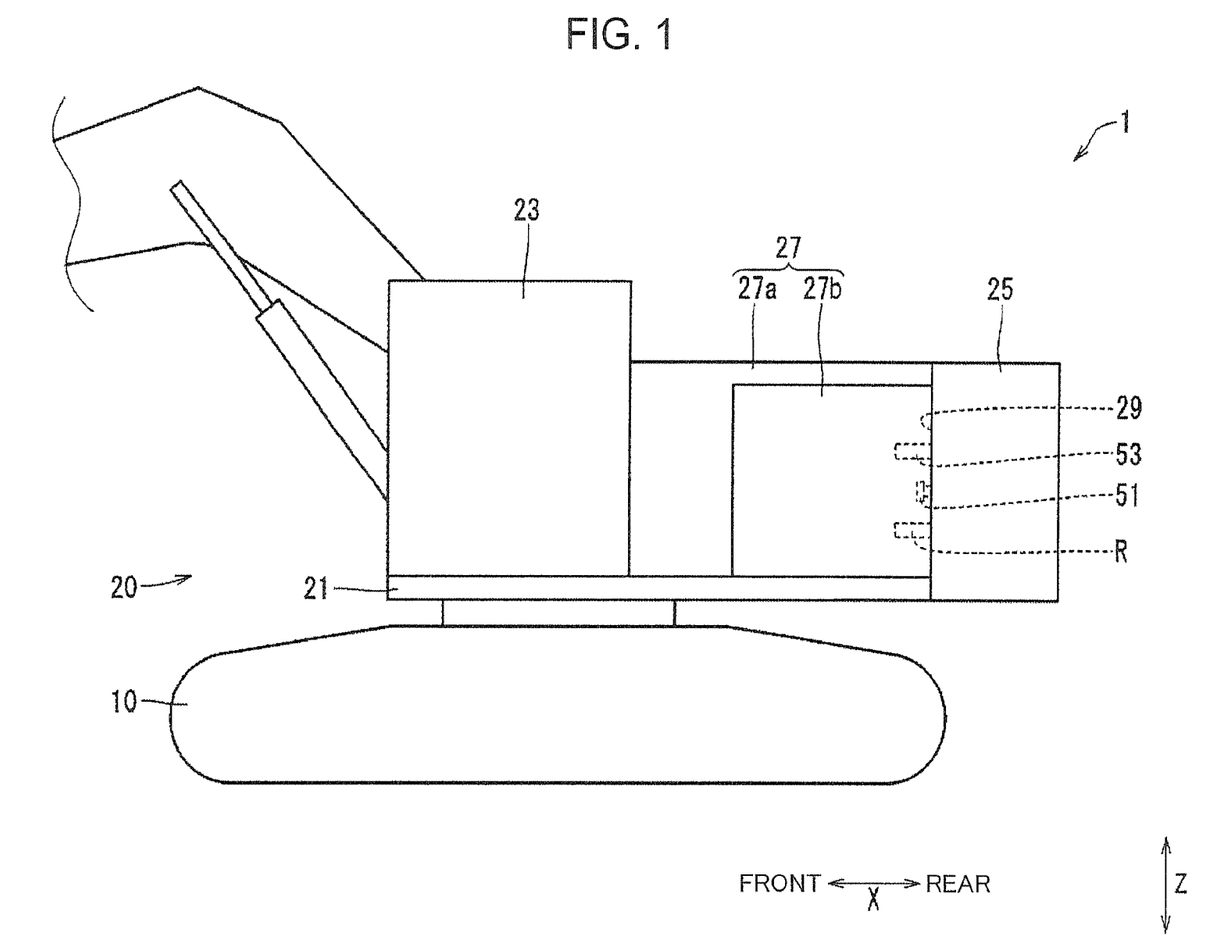
FIG. 1 is a side view of a construction machine according to an embodiment of the present invention.

The construction machine 1 is, for example, an excavator. The construction machine 1 includes a lower travelling body 10 capable of travelling on the ground, an upper stewing body 20, a battery shut-off circuit 30, a battery 33, and a controller 31.

The upper slewing body 20 is mounted on the lower traveling body 10 through a slewing device so as to be slewable with respect to the lower traveling body 10. The upper slewing body 20 includes an upper frame 21, a cab 23, a counter weight 25, a guard 27, and an interruption-switch mounting portion 29.

The cab 23 is mounted on a front side portion of the upper frame 21 and the counter weight 25 is mounted on a rear side portion of the upper frame 21. FIGS. 1, 3, 5, and 6 indicate a front-rear direction, a right-left direction, and an up-down direction of the upper slewing body 20 with respective arrows X, Y, and Z. The direction of an axis about which the upper frame 21 is slewed to the lower traveling body 10 is the up-down direction. The right-left direction is orthogonal to each of the up-down direction and the front-rear direction. The cab 23 forms a space allowing an operator to operate the construction machine 1 therein. The counter weight 25 is a weight for balancing a mass of the construction machine 1 with respect to the front-rear direction.

The guard 27 is an exterior member that covers equipment such as an engine and a hydraulic apparatus. The guard 27 includes a guard main body portion 27a and a guard opening/closing portion 27b. The guard opening/closing portion 27b is connected to the guard main body portion 27a so as to open/close an opening formed in the guard main body portion 27a. The guard opening/closing portion 27b may open/close the opening through either a rotation thereof relative to the guard main body portion 27a or attachment/detachment thereof to/from the guard main body portion 27a.

Figure 2:
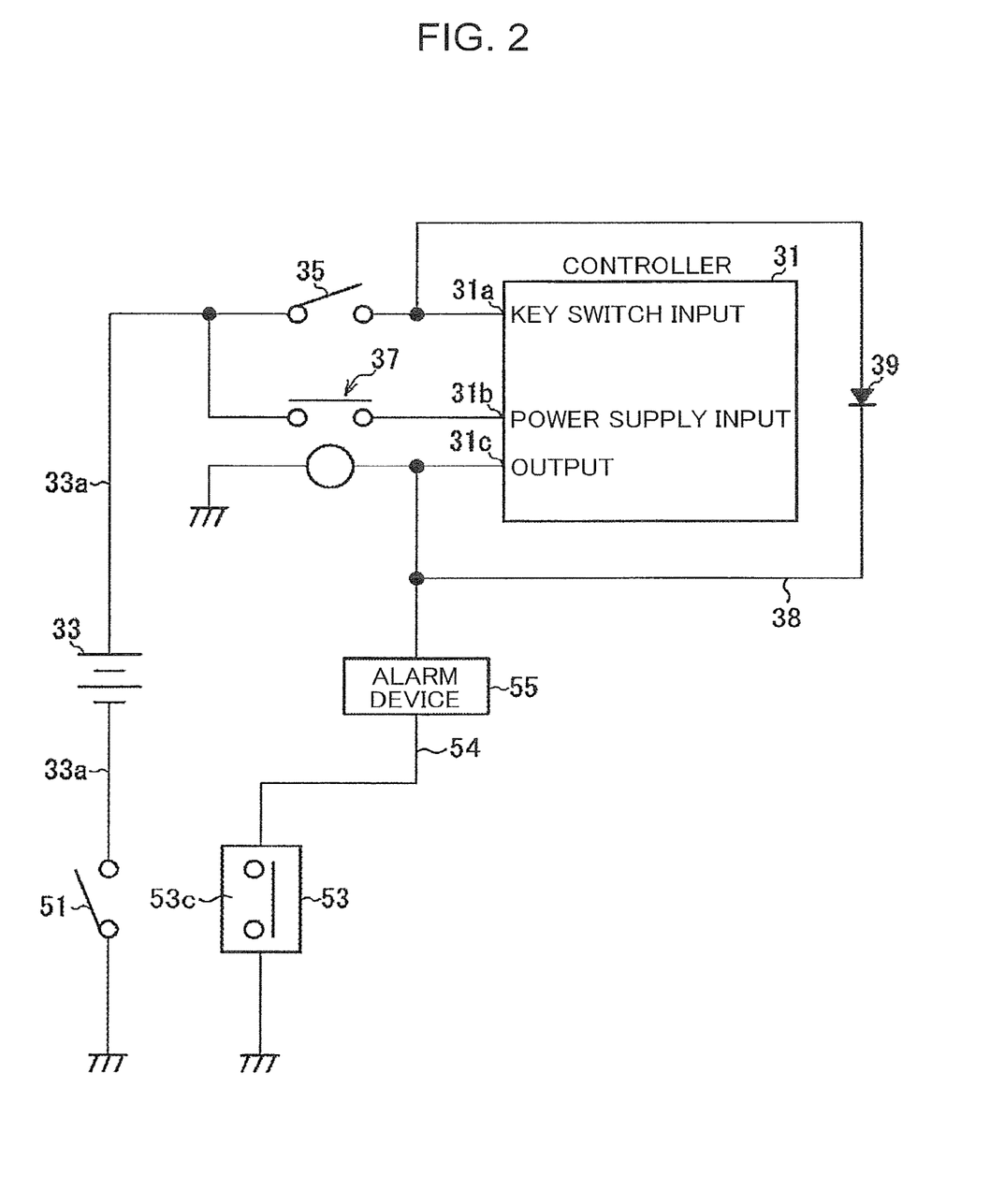
FIG. 2 is a diagram showing a battery shut-off circuit provided in the construction machine.

The battery shut-off circuit 30 is an electric circuit that conducts an electric interruption between the battery 33 and the controller 31 as shown in FIG. 2. The battery shut-off circuit 30 includes a key switch 35, self-holding means 37, a diode 39, an interruption switch 51, a sensor 53, and an alarm device 55.

The controller 31 controls operation of the construction machine 1. The controller 31 controls functions of the construction machine 1 when the key switch 35 is in a key-on state. The controller 31 is operated even after the key switch 35 is brought into a key-off state (after the key-off) to control a part of the functions of the construction machine 1 to be controlled in the key-on state. The functions to be controlled after the key-off include, for example, a communication function such as transmission of positional information. The positional information is obtained, for example, by a global positioning system (GPS) to be used, for example, for theft prevention.

The controller 31 is operated by supply of power from the battery 33. The controller 31 has a key switch input section 31a, a power supply input section 31b, and an output section 31c. The output section 31c outputs a command to control the functions of the construction machine 1. To the output section 31c are connected to not-graphically-shown devices that exhibit respective functions described above, the self-holding means 37, and the alarm device 55 and the like.

The battery 33 is connected to the power supply input section 31b of the controller 31 via the self-holding means 37. The battery 33 is connected to the key switch 35. The battery 33 supplies power also to the sensor 53 and the alarm device 55.

The key switch 35 instructs the controller 31 to halt and operate (including start) the engine. The key switch 35 is switched between the key-off state in which the key switch 35 provides an instruction to halt the engine and the key-on state in which the key switch 35 provides no instruction to halt the engine (e.g. the key switch 35 instructs start of the engine). The key switch 35 is connected to the key switch input section 31a of the controller 31. The key switch 35 can be called as a main power supply switch of the controller 31. The key switch 35 has an operable and closable contact, which is opened in the key-off state and closed in the key-on state.

The self-holding means 37 is, for example, a circuit or a relay for enabling power to be supplied from the battery 33 to the controller 31 even when the key switch 35 is in the key-off state, thereby causing the controller 31 to be operated. The self-holding means 37 causes supply of power from the battery 33 to the controller 31 when the key switch 35 is in the key-on state. The self-holding means 37 is connected to the power supply input section 31b and the output section 31c of the controller 31.

The interruption switch 51 is a switch for allowing an operator to manually shut off supply of power from the battery 33 to the controller 31. The interruption switch 51 is used, for example, for guarantee of safety, maintenance, regulation, theft prevention, prevention of the battery from going dead, and the like.

The interruption switch 51 is switchable between a supply allowing state of allowing the supply of power and a supply interruption state of interrupting the power supply. The interruption switch 51 is connected to one electrode of the battery 33. For example, the interruption switch is provided on a battery line 33a linking the negative electrode of the battery 33 and the earth. The interruption switch 51 has an openable and closable contact, which is closed in the supply allowing state and opened in the interruption state.

Figure 3:
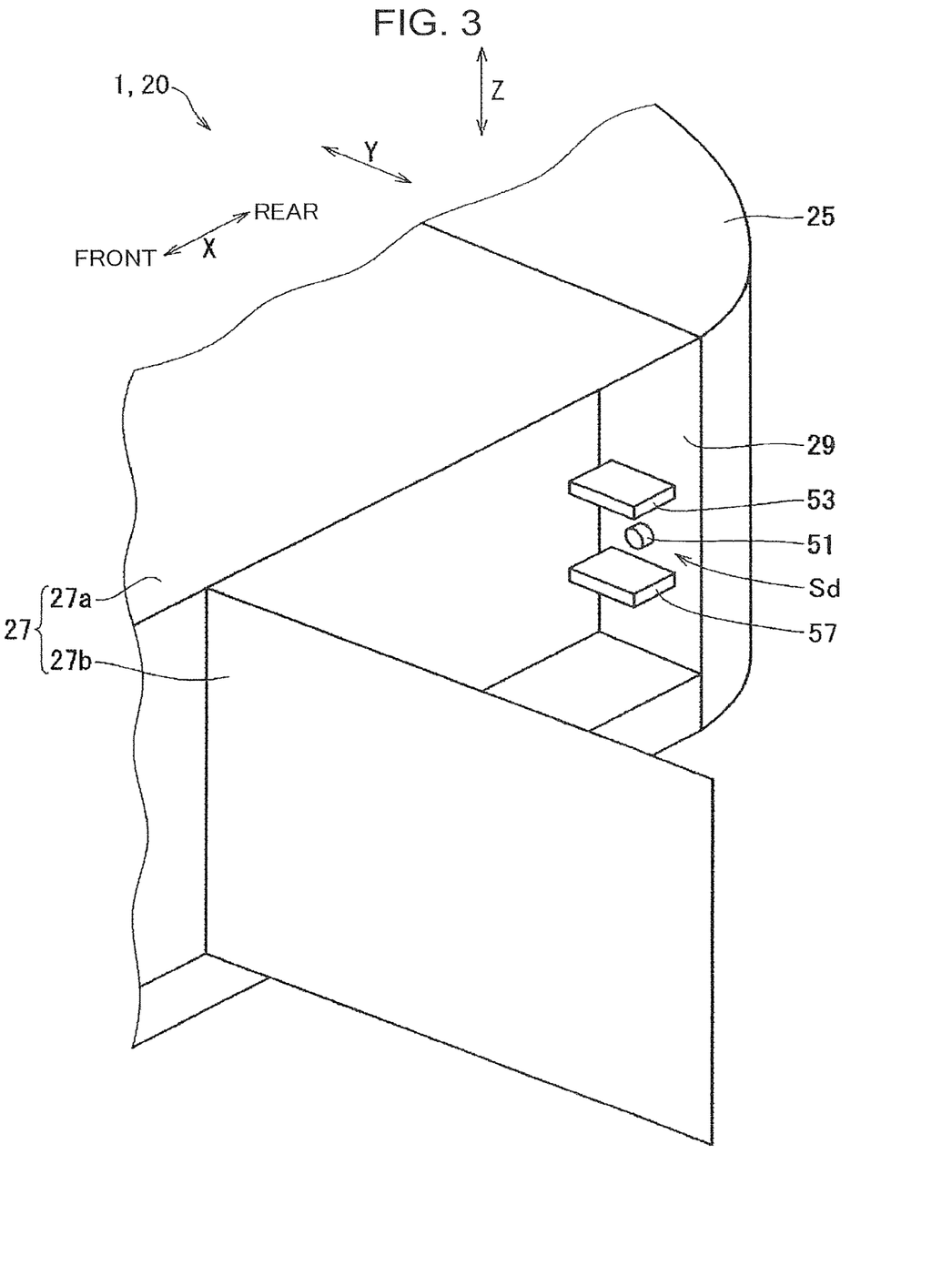
FIG. 3 is a perspective view of a place at which an interruption switch included in the battery shut-off circuit is disposed.

The interruption switch 51 is disposed outside the cab 23, for example, as shown in FIG. 1. The interruption switch 51 is covered with the guard 27. In other words, the interruption switch is disposed in a space having a locking function. Specifically, as shown in FIG. 3, the interruption-switch mounting portion 29 is provided inside the guard 27, and the interruption switch 51 is mounted on the interruption-switch mounting portion 29. The interruption switch 51 is thereby disposed in the vicinity of a front side surface of the counter weight 25. In summary, the interruption-switch mounting portion 29 is a part on which the interruption switch 51 is mounted. The interruption-switch mounting portion 29 is formed of, for example, a plate member. The plate member constitutes, for example, a box not shown. The interruption-switch mounting portion 29 may be, alternatively, not a plate member. The interruption switch 51 may be, for example, a press-button type or rotary type of switch.

The sensor 53 detects presence/absence of a predetermined interruption necessary motion. The interruption necessary motion is a motion necessary for manipulating the interruption switch 51. The interruption necessary motion is a motion which an operator needs to make for manipulation of the interruption switch 51. The sensor 53 determines "presence of the interruption necessary motion" by detecting presence of an object in a detection space Sd and determines "absence of the interruption necessary motion" by detecting absence of any object in the detection space Sd. The detection space Sd is a space in which there appears an object (that may be also a human body) related to the interruption necessary motion involved by the execution of the interruption necessary motion necessary for the manipulation of the interruption switch 51 by an operator. In the detection space Sd shown in FIG. 4, there appears a hand or the like of an operator without fail involved by a motion of the operator for manipulating the interruption switch 51 with the hand or the like. The detection space Sd is, in general, a space in the vicinity of the interruption switch 51 (a predetermined neighboring space). The sensor 53 is one capable of sensing a human body, for example, a non-contact sensor such as a proximity sensor, for example, a proximity switch, and for example, an optical sensor such as an optical sensor using infrared ray.

Figure 4:
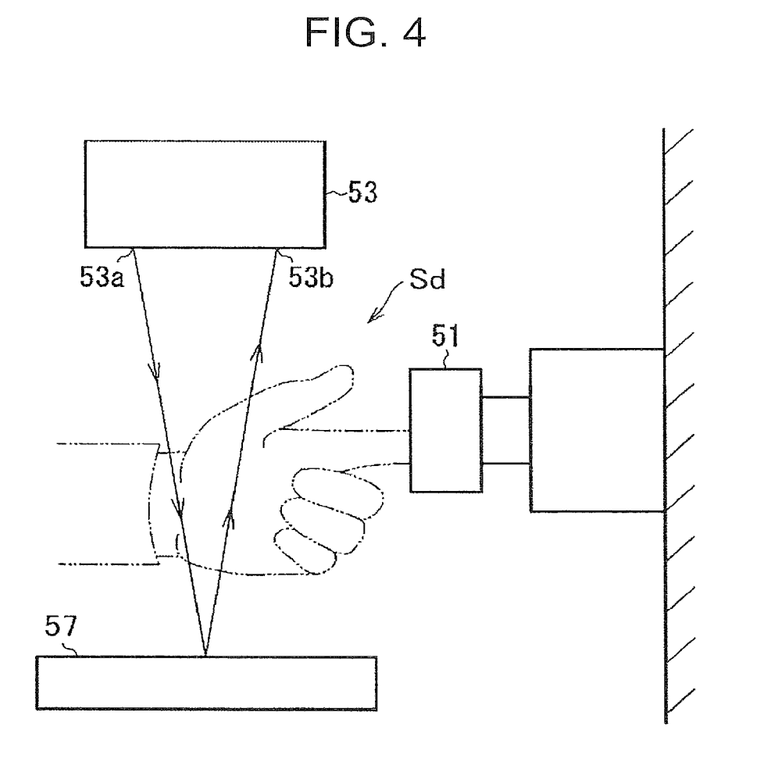
FIG. 4 is a view showing a sensor that detects interruption necessary operation to be applied to the interruption switch.

The sensor 53 according to the present embodiment includes a light emitting section 53a and a light receiving section 53b shown in FIG. 4, and an open/close switch 53c shown in FIG. 2.

The open/close switch 53c is provided in the middle of an alarm line 54 running from the output section 31c of the controller 31 to the earth. The open/close switch 53c has an openable and closable contact, which is closed to bring the alarm line 54 into an energizable state and opened to break the alarm line 54.

The light emitting section 53a and the light receiving section 53b are disposed in the vicinity of the interruption switch 51 so as to be opposed to a reflective plate 57 across the detection space Sd, as shown in FIG. 4. Specifically, the sensor 53 is disposed so as to allow the light emitted from the light emitting section 53a, when there exists no object in the detection space Sd, to be reflected by the reflective plate 57 to enter the light receiving section 53b and so as to cause the light emitted from the light emitting section 53a, when there exists an object in the detection space Sd, to be blocked by the object to be prevented from entering the light receiving section 53b. The sensor 53 opens the contact of the open/close switch 53c when the light receiving section 53b receives the light whereas the sensor 53 closes the contact of the open/close switch 53c when the light receiving section 53b fails to receive the light.

The alarm device 55 is arranged in series with the open/close switch 53c on the alarm line 54 and issues an alarm only when energized. Accordingly, the alarm device 55 issues an alarm only in the case where a predetermined condition is satisfied, i.e., only when the sensor 53 senses presence of an object in the detection space Sd, and issues no alarm in the case where the predetermined condition is not satisfied.

The alarm device 55 is disposed at a position where the alarm device 55 is able to give an alarm to an operator who intends to manipulate the interruption switch 51. For example, the alarm device 55 is disposed in the vicinity of the interruption switch 51; it may be disposed inside the guard 27 shown in FIG. 3 or may be disposed outside the guard 27. The alarm device 55 shown in FIG. 2 may be a device that outputs sound (blows), such as a buzzer, or may be a device that emits light, such as a lamp. Alternatively, the alarm device 55 can be a display device that conducts display related to alarm.

To the alarm line 54 is connected a power supply line 38 running from a position between the key switch 35 and the key switch input section 31a to the alarm line 54. Hence, when the key switch 35 is in the key-on state, the alarm line 54 can be supplied with power from the battery 33 through the power supply line 38. The diode 39 is provided in the middle of the power supply line 38 to prevent an output signal from the output section 31c of the controller 31 from reversely flowing through the power supply line 38 to be input to the key switch input section 31a when the key switch 35 is in the key-off state. This prevents the controller 31 from erroneously determining that the key switch 35 is in the key-on state in spite of the key-off state of the key switch 35.

Next will be described the action of the construction machine 1. When the key switch 35 is switched from the key-off state to the key-on state while the interruption switch 51 is in the on state, i.e., in the supply allowing state, the engine starts. At this time, the self-holding means 37 runs into the on state where the contact of the switch of the self-holding means 37 is closed to allow the battery 33 to supply power to the controller 31. The controller 31 receives supply of the power to control a predetermined function of the construction machine 1.

When the key switch 35 is switched from the key-on state to the key-off state while the interruption switch 51 is in the supply allowing state, the engine is halted whereas the self-holding means 37 maintains its on state to maintain allowance of supply of power from the battery 33 to the controller 31. At this time, the controller 31 continues the control of the function to be operated even after key-off.

If the interruption switch 51 is turned off, i.e., is brought into the supply interruption state while the controller 31 is controlling the function to be operated even after key-off, the interruption of supply of power from the battery 33 to the controller 31 causes the function to be operated even after key-off to be halted, generating the possibility of failure in the construction machine 1. However, in the circuit, issuing the alarm by the alarm device 55 only when all of the following conditions, [condition a] to [condition d], are satisfied efficiently restricts erroneous switching of the interruption switch 51 into the supply interruption state.

[condition a]: The key switch 35 is in the key-off state.
[condition b]: The interruption switch 51 is in the supply allowing state.
[condition c]: The controller 31 is being operated. More specifically, the controller 31 is controlling the function to be operated even after key-off.

[condition d]: The sensor 53 is detecting presence of the interruption necessary motion: in the embodiment, the contact of the open/close switch 53c of the sensor 53 is closed.

Thus, in the circuit, the section provided with the interruption switch 51, the battery 33, the key switch 35, the controller 31, and the alarm line 54 including the open/close switch 53c of the sensor 53 configure an alarm control device that energizes the alarm device 55 to cause the alarm device 55 to issue an alarm only when the condition a to the condition d are satisfied.

It is also permissible to set a further condition for allowing the alarm control device to cause the alarm device 55 to issue an alarm, in addition to the above [condition a] to [condition d].

Issuing an alarm by the alarm device 55 only in a limited case where the condition a to the condition d are simultaneously satisfied as described above is extremely effective to prevent the interruption switch 51 from being erroneously switched to the supply interruption state. For example, according to the invention recited in Patent Literature 1, there can be a case where the display portion is constantly lighted while the controller is being operated after the key-off, and such constant lighting of display might fail to inform the operator what is specifically inhibited. On the other hand, operating the alarm device 55 only when all the condition a to the condition d are satisfied makes it possible to issue an alarm only in a case where there exists a motion of the operator who intends to manipulate the interruption switch 51 (intends to bring it into the interruption state), that is, to issue an alarm corresponding directly to the motion of the operator, thereby enabling the operator to be explicitly informed that his/her manipulation of switching the interruption switch 51 to the supply interruption state may cause a failure of operation of the construction machine 1. This makes it possible to more effectively restrict erroneous manipulation of the interruption switch 51. Thus, halt of the function can be effectively restricted, the function being controlled by the controller 31 while the key switch 35 is in the key-off state.

The alarm control device according to the present invention is not limited to the circuit shown in FIG. 2. The alarm control device may be, for example, a computer configured to perform: receiving respective signals from the key switch 35, the interruption switch 51, the controller 31, and the sensor 53 that correspond to the above condition a to condition d, respectively; judging whether or not each of the condition a to the condition d is satisfied; and inputting a command to the alarm device 55 on the basis of the judgment result.

Besides, issuing an alarm when the interruption necessary motion that is necessary for manipulation of the interruption switch is conducted as described above eliminates a necessity of physically disabling the interruption switch 51 from being manipulated (i.e., locking). This makes it possible to allow an operator to dare to bring the interruption switch 51 into the supply interruption state, regardless of the alarm, to interrupt the supply of power from the battery 33 to the controller 31. This enables the operator to cope with such emergency as an accident of electric wire short-circuit in a car body by means of interrupting power supply (emergency countermeasure). The present invention, however, does not exclude a mode of physically disabling the interruption switch from being manipulated when a predetermined condition is satisfied.

In the embodiment, a space is set as the detection space Sd, in which an object related to the interruption necessary motion appears involved by the interruption necessary motion necessary for manipulating the interruption switch 51; this enables the sensor 53 to reliably detect presence/absence of the interruption necessary motion, i.e., operation necessary for manipulating the interruption switch 51, by detecting presence/absence of an object in the detection space Sd. For example, when the operator inserts his/her hand into the detection space Sd in order to manipulate the interruption switch 51, the sensor 53 allows an alarm of the hand insertion operation to be issued by sensing the presence of the hand.

Figure 5:
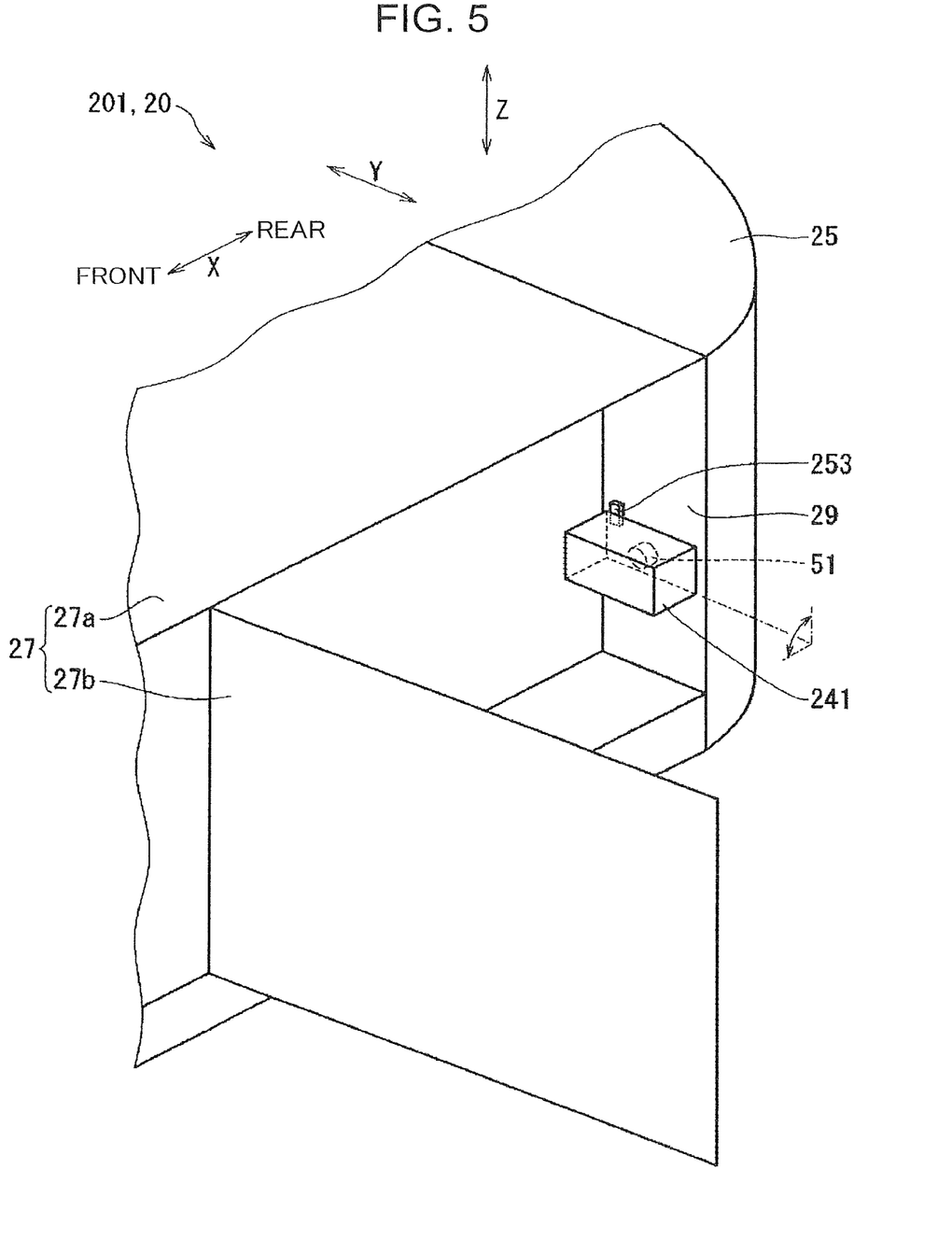
FIG. 5 is a perspective view corresponding to FIG. 3, showing a main part of a construction machine according to a second embodiment of the present invention.

FIG. 5 shows a construction machine 201 according to a second embodiment of the present invention. Below will be described a difference between the construction machine 201 and the construction machine 1 according to the first embodiment. Components of the construction machine 201 common to the components of the construction machine 1 according to the first embodiment are given the same reference signs as those of the first embodiment and description of such components is omitted. Such omission of description will be similarly made in a third embodiment to be described later.

The construction machine 201 according to the second embodiment includes a switching member not included in the first embodiment, namely, a cover 241. Besides, the construction machine 201 includes a sensor 253 in place of the sensor 53 of the first embodiment shown in FIG. 3.

The cover 241 is switchable between a manipulation prevention state and a manipulation allowing state. The manipulation prevention state is a state of preventing the interruption necessary motion, which is necessary for manipulating the interruption switch 51, by covering the interruption switch 51. The manipulation allowing state is a state of opening the interruption switch 51 to at least an extent to allow the interruption necessary motion to be made, by not covering the interruption switch 51 or covering only a part thereof. The cover 241 is attached to the interruption-switch mounting portion 29. The cover 241 and the interruption-switch mounting portion 29 enclose a space, in which space the interruption switch 51 is disposed. The cover 241 is attached to the interruption-switch mounting portion 29 so as to be rotatable, for example, rotatable around a rotation axis extending in a lateral direction Y, being allowed to move, through the rotation thereof, between a closed position for covering the interruption switch 51 and an open position for opening the interruption switch 51. The cover 241 may be switched between the manipulation prevention state and the manipulation allowing state, alternatively, by being attached/detached to/from the interruption-switch mounting portion 29, that is, by being attached to the interruption-switch mounting portion 29 or being detached therefrom.

The sensor 253 detects whether the cover 241 is in the manipulation allowing state or in the manipulation prevention state, thereby detecting presence/absence of the interruption necessary motion. The sensor 253 according to the present embodiment detects whether the cover 241 is in the closed position or in the open position. The sensor 253 can determine absence of the interruption necessary motion by detecting that the cover 241 is closing. The sensor 253 can determine presence of the interruption necessary motion by detecting that the cover 241 is opening.

The sensor 253 is, for example, a limit switch. The sensor 253 is attached to the interruption-switch mounting portion 29 that is a part on which the cover 241 is mounted. The sensor 253 is disposed at a position where the sensor 253 can contact the cover 241. The sensor 253 has a movable portion and a switch contact. The movable portion is pressed by the cover 241 being at the closed position, thus closing the switch contact. The movable portion is not pressed by the cover 241 being at the open position, thus keeping the switch contact opened. The sensor 253 may be, alternatively, attached to the cover 241.

The sensor 253 according to the second embodiment senses whether the cover 241 is at the closed position where the cover 241 hinders the interruption necessary motion that is necessary for manipulation of the interruption switch 51 or at the open position where the cover 241 allows the interruption necessary motion, thereby appropriately detecting presence/absence of the interruption necessary motion for manipulating the interruption switch 51.

Figure 6:
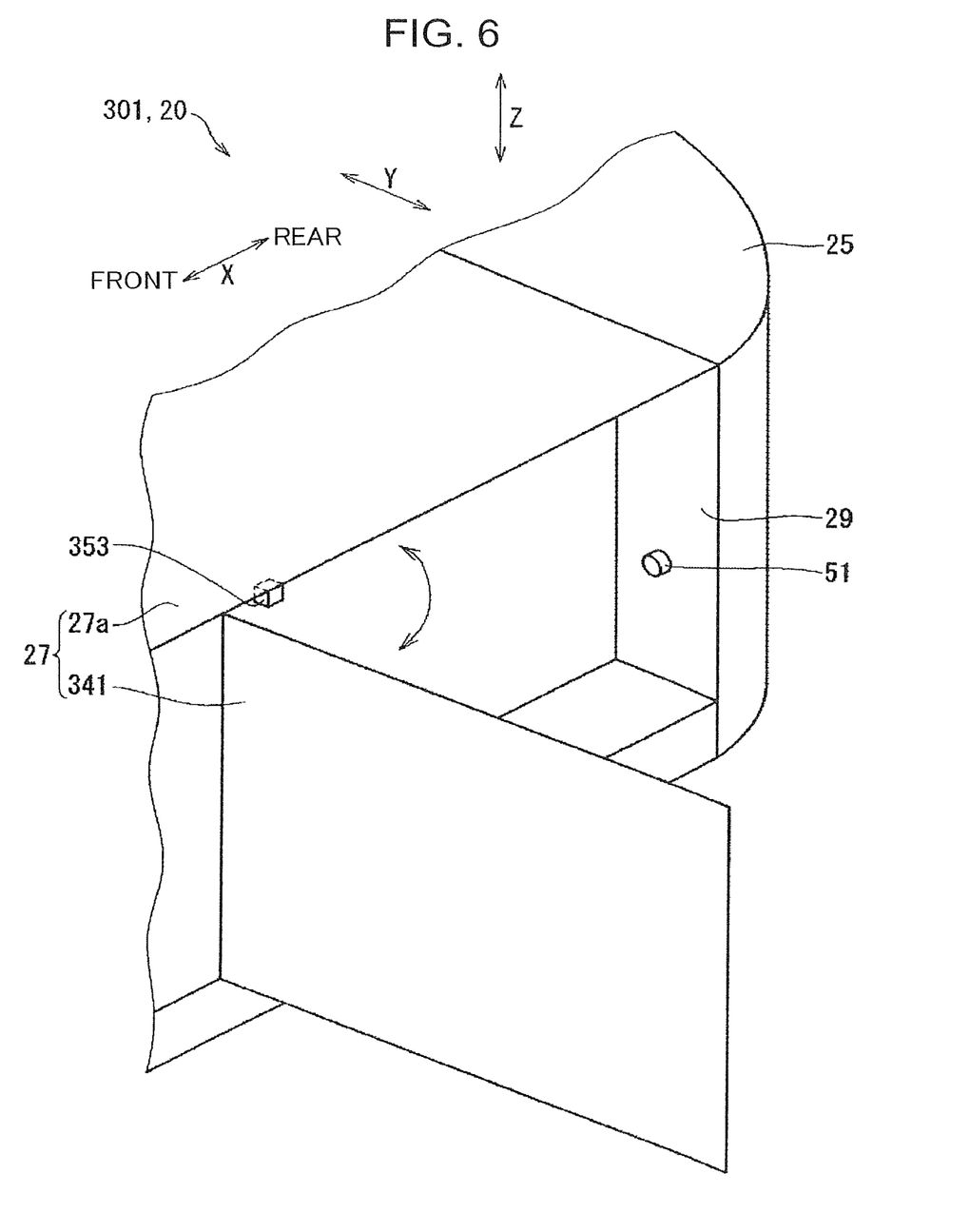
FIG. 6 is a perspective view corresponding to FIG. 3, showing a main part of a construction machine according to a third embodiment of the present invention.

FIG. 6 shows a construction machine 301 according to a third embodiment of the present invention. Below will be described a difference between the construction machine 301 and the construction machine 201 according to the second embodiment.

The construction machine 301 includes a guard opening/closing portion 341 as an opening/closing member corresponding to the cover 241 of the second embodiment shown in FIG. 5, and a sensor 353 corresponding to the sensor 253 of the second embodiment.

The guard opening/closing portion 341 is connected to the guard main body portion 27a so as to open/close an opening formed in the guard main body portion 27a similarly to the guard opening/closing portion 27b in the second embodiment shown in FIG. 5; moreover, the guard opening/closing portion in the present embodiment can be used also as a switching member switchable between the manipulation prevention state of closing the opening to prevent the interruption necessary motion for manipulating the interruption switch 51 and the manipulation allowing state of opening the opening to allow the interruption switch 51 to be manipulated through the opening.

The sensor 353 specifies presence/absence of the interruption necessary motion by detecting whether the guard opening/closing portion 341 is in the manipulation prevention state of closing the opening or in the manipulation allowing state of opening the opening. The sensor 353 is attached to the guard main body portion 27a, at a position where the sensor 353 comes into contact with the guard opening/closing portion 341 closing the opening. Alternatively, the sensor 353 may be attached to the guard opening/closing portion 341.

The present invention is not limited to the above-described embodiments. The arrangement and shapes of the respective components of the above embodiments may be changed. For example, the position and orientation of the interruption switch 51 are not limited to the position and orientation shown in FIG. 1. The interruption switch 51 can be disposed at an arbitrary position of the construction machine 1 in an arbitrary orientation.

The configuration of the circuit shown in FIG. 2 can be modified. For example, although the sensor 53 and the alarm device 55 shown in FIG. 2 are electrically connected in series, these may be electrically connected in parallel to each other. A power supply for the sensor 53 and the alarm device 55 is not limited to the battery 33 and may not necessarily be a common power supply. The shape of the interruption switch 51 is not limited to the shape shown in FIG. 4 or the like. A part of the components of the above embodiments may be omitted or the number of the components may be changed. For example, the sensor 53 shown in FIG. 1 may be provided at each of several places; the alarm device 55 may be provided at each of several places.

The components in each of the above embodiments may be combined. For example, two or more sensors of the sensor 53 of the first embodiment (see FIG. 3), the sensor 253 of the second embodiment (see FIG. 5), and the sensor 353 of the third embodiment (see FIG. 6) may be combined. In this case, the alarm device 55 may output different alarms according to a sensor that has detected predetermined manipulation among the plurality of sensors.

As described above, provided is a construction machine equipped with a battery, a key switch, and a controller, the construction machine being capable of efficiently restricting erroneous interruption of supply of power from the battery to the controller in a key-off state of the key switch to halt a function that has been controlled until then by the controller. The provided construction machine includes a battery, a controller, a key switch, an interruption switch, a sensor, an alarm device capable of issuing an alai in, and an alarm control device that causes the alarm device to issue an alarm. The controller is operated by supply of power from the battery. The key switch is connected to the controller and switched between a key-off state of providing the controller with an instruction to halt an engine and a key-on state of providing the controller with no instruction to halt the engine. The interruption switch is switched between a supply allowing state of allowing supply of power from the battery to the controller and a supply interruption state of interrupt supply of power from the battery to the controller. The sensor detects presence/absence of interruption necessary motion which is a motion necessary for manipulating the interruption switch. The alarm control device causes the alarm device to issue the alarm only when a condition that the key switch is in the key-off state, a condition that the interruption switch is in the supply allowing state, a condition that the controller is being operated, and a condition that the sensor has detected presence of the interruption necessary motion are all satisfied.

The alarm control device, configured to cause the alarm device to issue an alarm only when the sensor has detected presence of the interruption necessary motion, enables effective alarming to be performed against inappropriate manipulation of the interruption switch, differently from conventional art with possibility of constant alarm.

The manner of detecting presence/absence of the interruption necessary motion by the sensor can be variously set. For example, a space in which an object appears involved by the interruption necessary motion may be set as a detection space and the sensor may detect presence/absence of an object in the detection space. Alternatively, it is also possible that the construction machine further includes a switching member that is switchable between a manipulation prevention state of covering the interruption switch so as to prevent the interruption necessary motion and a manipulation allowing state of opening the interruption switch so as to allow the interruption necessary motion, while the sensor detects whether the switching member is in the manipulation prevention state or in the manipulation allowing state.

The invention claimed is:

1. A construction machine comprising:
   a battery;
   a controller that is operated by supply of power from the battery;
   a key switch that is connected to the controller and switched between a key-off state of providing the controller with an instruction to halt an engine and a key-on state of providing the controller with no instruction to halt the engine;
   an interruption switch that is switched between a supply allowing state of allowing supply of power from the battery to the controller and a supply interruption state of interrupt supply of power from the battery to the controller, the interruption switch being disposed outside a cab of the construction machine and allowing an operator to manually shut off supply of power;
   a sensor that detects presence/absence of interruption necessary motion which is a motion necessary for manipulating the interruption switch;
   an alarm device capable of issuing an alarm; and
   an alarm control device that causes the alarm device to issue the alarm only when a condition that the key switch is in the key-off state, a condition that the interruption switch is in the supply allowing state, a condition that the controller is being operated, and a condition that the sensor has detected presence of the interruption necessary motion are all satisfied,
   wherein the state of the key switch and the state of the interruption switch are independently changeable.

2. The construction machine according to claim 1, wherein a space in which an object appears involved by the interruption necessary motion is set as a detection space, and the sensor detects presence/absence of the object in the detection space.

3. The construction machine according to claim 1, further comprising a switching member that is switchable between a manipulation prevention state of covering the interruption switch so as to prevent manipulation of the interruption switch and a manipulation allowing state of opening the interruption switch so as to allow the manipulation of the interruption switch, wherein the sensor detects whether the switching member is in the manipulation prevention state or in the manipulation allowing state.

* * * * *